Dec. 5, 1950 L. J. EBERT 2,532,764
SEPARABLE TIRE RIM
Filed March 4, 1948

INVENTOR.
Louis J. Ebert
BY Victor J. Evans & Co.
ATTORNEYS

Patented Dec. 5, 1950

2,532,764

UNITED STATES PATENT OFFICE 2,532,764

SEPARABLE TIRE RIM

Louis J. Ebert, Little Valley, N. Y.

Application March 4, 1948, Serial No. 12,988

2 Claims. (Cl. 152—412)

This invention relates to tire rims, and more particularly to a separable and quickly demountable tire rim.

An object of the invention is to provide a tire rim that can be separated or assembled without the use of tools for the mounting or demounting of the tire thereon.

Another object of the invention is to provide a tire rim that is divided into two sections, and the two sections are retained in assembled relation to each other without the use of bolts or analogous fastening devices.

With the above and other objects and advantages in view, the invention consists of the novel details of construction, arrangement and combination of parts more fully hereinafter described, claimed and illustrated in the accompanying drawing in which:

Figure 1:
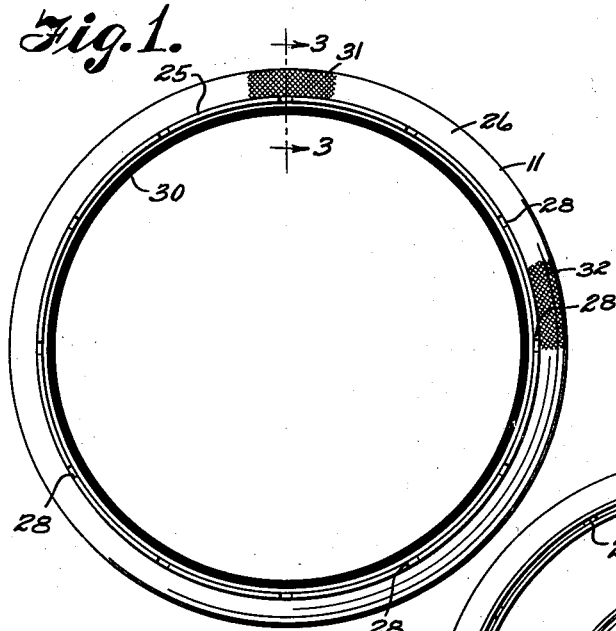
Figure 1 is an elevational view of the removable section of a rim embodying the invention.

Referring more in detail to the drawing, the rim embodying the invention comprises a section 10 that is adapted to be fixed to a brake of a motor vehicle, and a removable section 11 which is adapted to be removably connected to the section 10.

The section 10 comprises a bottom annular portion 12, which is provided centrally thereof with the annular concavo-convex portion 13. The concave face of the portion 13 receives the inner tube A, and the convex face of the portion has welded thereto as at 14, the bulged circular portion 15. The portion 15 has the central opening 16 for the axle of the motor vehicle, and the radially disposed relatively spaced openings 17 to receive the lug bolts usually employed to secure a wheel to the brake drum of a motor vehicle.

Welded to the convex face of the portion 13 by means of a complementary curved edge 18, is an annular flange or ring 19. The flange 19 is disposed inwardly of the bottom face of the bottom portion 12, and the outer edge of the rim and flange terminate in the same vertical plane. The flange 19 is spaced from the bottom portion 12 to form the annular groove or slot 20. Radially disposed with regard to the axis of the section 10 and fixed at their outer ends to the flange 19 and rim 12 in relatively spaced relation to each other, are the pins 21, the use of which will be later described.

Figure 5:
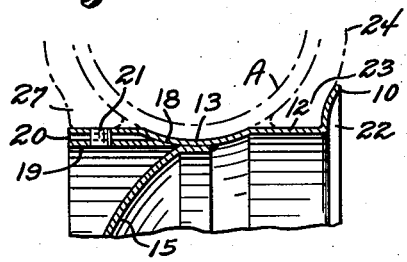
Figure 5 is a vertical, sectional view on the line 5—5 of Figure 2.
Figure 4:
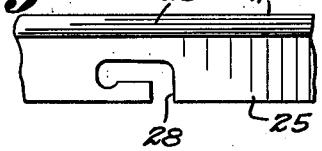
Figure 4 is a fragmentary, detailed view showing the connecting slot in the movable section.

The rim 12, at its outer annular periphery, is formed with the conventional clincher edge 22, which engages the beading 23 of the tire 24 when the tire is mounted as shown in Figure 5.

Figure 6:
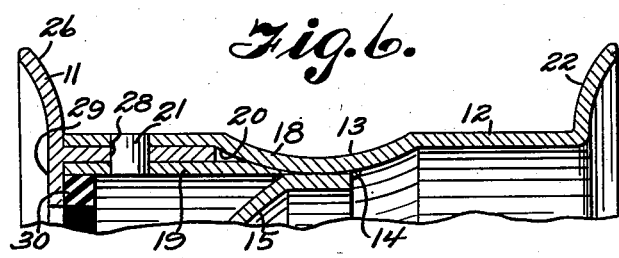
Figure 6 is a transverse, sectional view of an assembled rim.

The section 11 comprises a bottom annular portion 25, which is formed at its outer annular periphery with the conventional clincher edge 26 which engages the beading 27 of the tire 24 when the tire is mounted on the assembled rim, as shown in Figure 6.

The portion 25 of the section 11 is provided with the hook shaped slots 28, which being of the same number as the pins 21, will engage the pins 21 and retain the sections in fixed relation to each other.

Figure 3:
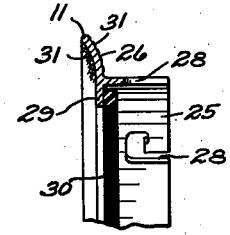
Figure 3 is a vertical, sectional view on the line 3—3 of Figure 1.
Figure 2:
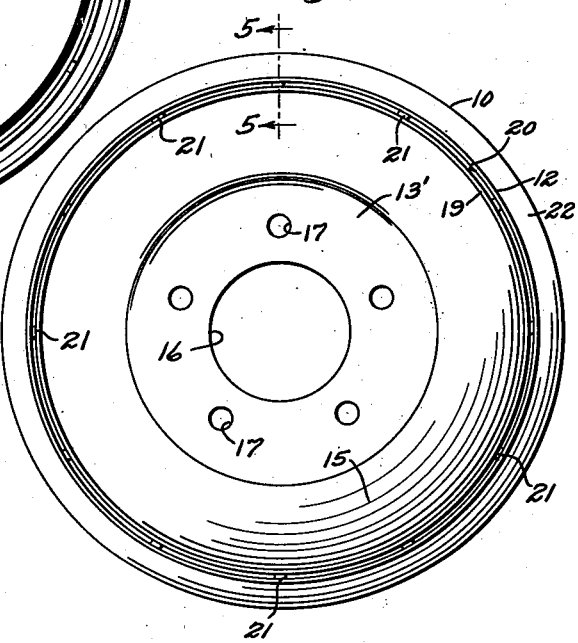
Figure 2 is an elevational view of the section of the rim that is fixed to the brake drum of a motor vehicle.

The clincher edge 26, as seen in Figure 3, extends below the bottom face of the portion 25, to form the annular flange 29. To the rear face of the flange 29, there is secured by a suitable adhesive means, the rubber sealing ring 30, which seals the lower face of the joint, as shown in Figure 6, while the upper face of the joint is sealed by the tube and tire.

The outer and inner faces of the edge 26, as seen in Figures 1 and 3, are provided with opposed relatively spaced knurled surfaces 31 and 32 respectively, which form a gripping surface for the hands of the operator in removing the section 11 from the section 10.

In use, when the tire is to be mounted on the section 10, the section 10 is first fixed to the brake drum by the conventional lug bolts. The deflated tire and tube are then placed on the section. The section 11 is then grasped in the operator's hands, and the portion 25 is inserted in the slot 20 so that the pins 21 can be inserted into the slots 28. The section 11 is then slightly rotated to the left to move the pins into the hooked slots to retain the sections in fixed relation to each other. The tube is then inflated and the vehicle is ready for operation.

Should it be necessary to remove the tire and tube from the section 10, the procedure is reversed, the section 11 being rotated to the right to disengage the pins from their respective slots and the section is removed.

However, under some circumstances, it would be more convenient to assemble the wheel and tire off of the car. In this instance, the tire and tube are placed on the section 10, before it is fixed to the brake drum. The section 11 is positioned as described after the tire and tube have been placed on the section 10. The sections are fixed together and the whole assembly may then be mounted on the brake drum by the conventional lug bolts.

In the same manner, the entire assembly may be removed from the brake drum before the sections are separated for the removal of the tire and tube.

Thus the invention is susceptible of being used in the most convenient manner to the person changing the tire and tube.

From the foregoing description, it is thought that the construction and manner of operation of the rim will be apparent to those skilled in the art, and it is to be understood that changes in the minor details of construction, arrangement and combination of parts may be resorted to, provided they fall within the spirit of the invention and the scope of the appended claims.

Having thus described the invention, what is claimed as new and desired to be secured by Letters Patent is:

1. A separable rim of the type described comprising a section adapted to be fixed to the brake drum of an automobile to support a tire and tube and a section removably connected to the first section to retain the tire on the first section, said first section having a centrally located concavo-convex portion to receive the tube therein and an annular receiving portion secured at its inner periphery to the bottom surface of said last mentioned portion to form an annular slot which is adapted to receive the second section, pins carried by the first section and hook shaped slots formed in the second section, which are adjusted to engage said pins to retain said sections in fixed yet removable relation to each other and relatively spaced and opposed knurled surfaces on said second section to provide gripping surfaces for said second section.

2. The invention as in claim 1, wherein said second section is provided with a rubber sealing ring to seal the joint formed by the connection between the first and second sections of the rim.

LOUIS J. EBERT.

REFERENCES CITED

The following references are of record in the file of this patent:

UNITED STATES PATENTS

| Number | Name | Date |
| --- | --- | --- |
| 871,460 | Valentine | Nov. 19, 1907 |
| 895,762 | Jeffery | Aug. 11, 1908 |
| 1,097,427 | Hadfield | May 19, 1914 |
| 1,637,599 | Ballew | Aug. 2, 1927 |
| 1,981,776 | Boyd | Nov. 20, 1934 |

FOREIGN PATENTS

| Number | Country | Date |
| --- | --- | --- |
| 548,040 | France | 1922 |